May 12, 1942.　　C. D. WAGNER　　2,283,110
SAFETY THROW-OFF
Filed Dec. 18, 1940　　2 Sheets-Sheet 1
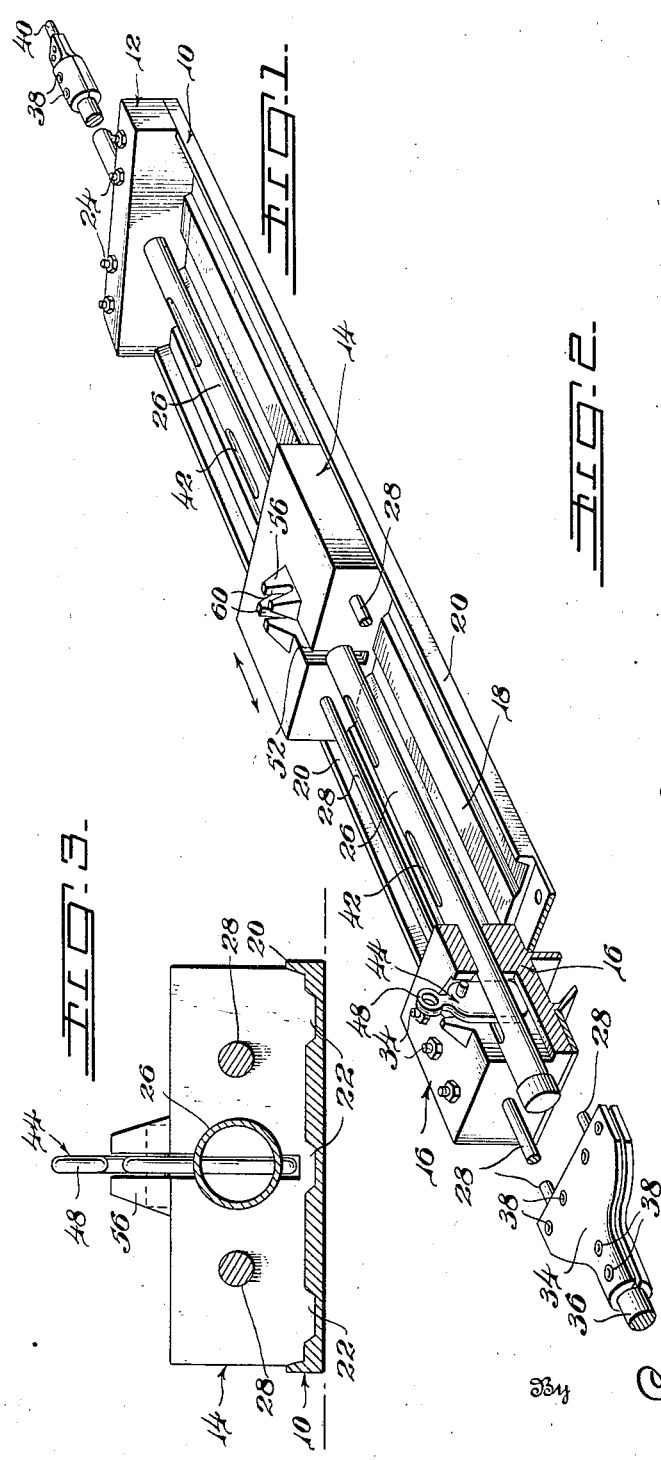
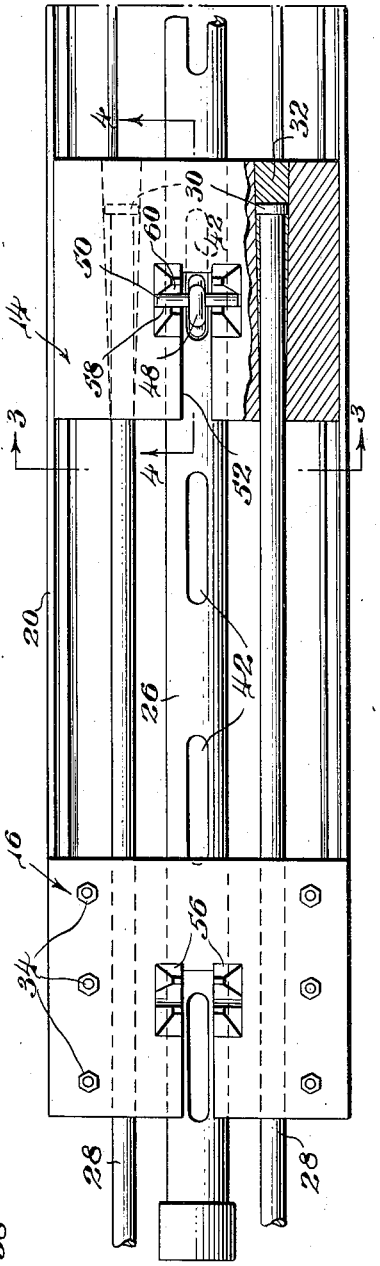
Inventor
CARL D. WAGNER May 12, 1942.   C. D. WAGNER   2,283,110
SAFETY THROW-OFF
Filed Dec. 18, 1940   2 Sheets-Sheet 2
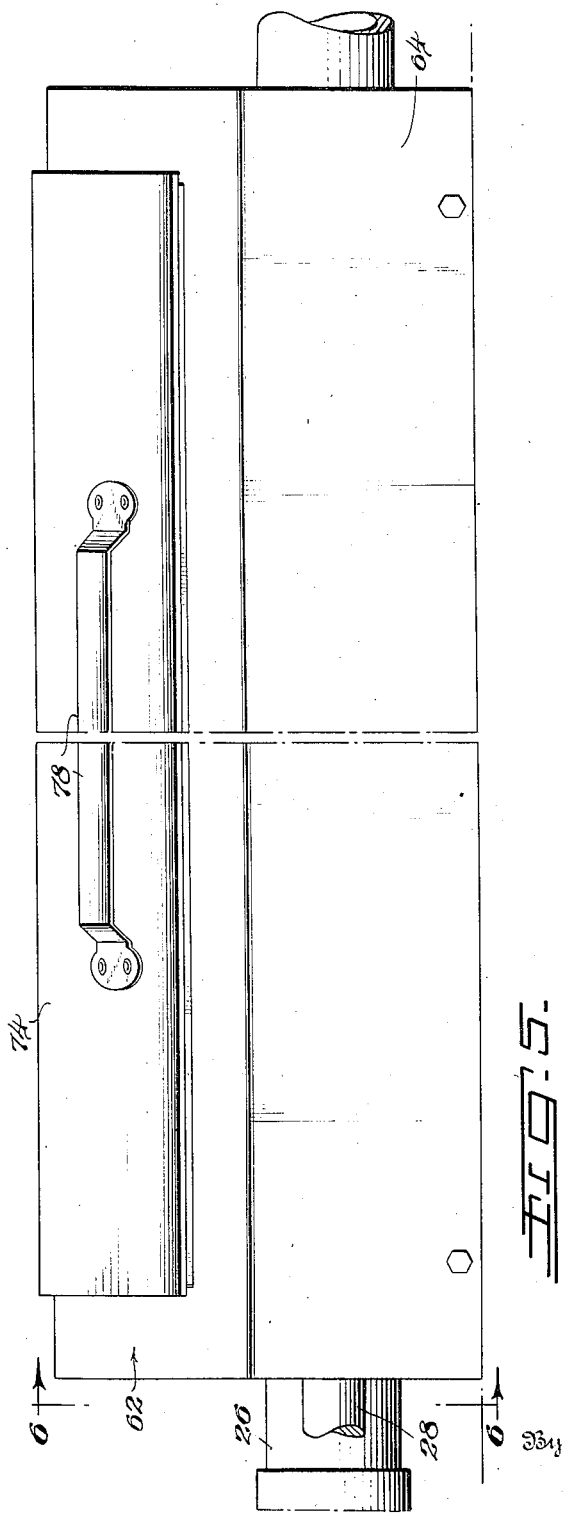
Inventor
CARL D. WAGNER Patented May 12, 1942

2,283,110

UNITED STATES PATENT OFFICE 2,283,110

SAFETY THROWOFF

Carl D. Wagner, Tulsa, Okla.

Application December 18, 1940, Serial No. 370,719

11 Claims. (Cl. 74—593)

The present invention relates to a power coupling device and more particularly to a safety coupling device for a power rod line in the operation of oil well pumps.

More particularly, the present device contemplates the provision of a construction interposed within the surface rod line and preferably between a pumping jack, for example, and the source of power adapted to permit selective control of the pump as well as controlled location and shifting of the pump within its casing. Thus, the present device is concerned with means for permitting controlled initiation and termination of the pumping action as well as controlled longitudinal shifting of the surface rod line to a desired position of operation where it may be held or released as desired. Prior devices for so controlling the rod line of which I am aware have had numerous disadvantages. Many of these devices have presented a serious danger to the hands of the operator in respect to requiring hooks to be caught and manipulated on the fly. The utilization of the ordinary ratchet means to accomplish the desired function has resulted in a structure lacking in the desired structural permanence and characterized by a creation of frictional binding forces and propensity to wear and failure.

It is accordingly an important object of the present invention to provide a throw-off device of improved structural permanence and reliability wherein the driving and manipulating forces are resolved axially of the device in order to eliminate undesired frictional binding forces adapted to permit free operation without loss of power. In this connection, the invention is of importance particularly in the operation of deep wells which may function under considerable load.

A further object of the present invention contemplates the provision of a throw-off device as above, eliminating ratchet teeth and presenting all of the obvious structural advantages of those driving constructions wherein the moving parts are connected by means extending rigidly therethrough and adapted to provide a permanent positive interlocking of the parts.

Another object of the present invention contemplates the provision of a throw-off device as above adapted to selectively and automatically pull the well into any desired pumping position to permit release of the surface rod line for repair or adjustment.

Among other objects of the present invention are to provide a construction as above wherein personal danger to the operator is eliminated; to provide a device wherein all holding and driving forces are distributed uniformly and laterally across the transmission members; to provide a construction which is compact and capable of being readily installed, protected and repaired.

Yet other and further objects will be apparent from a consideration of the following detailed description when taken in connection with the attached drawings, wherein:

Figure 1 is a perspective view of a throw-off device constructed in accordance with the present invention;

Figure 2 is a plan view of the central portions of the device shown in Figure 1;

Figure 3 is a detailed sectional view taken transversely through the throw-off device on the line 3—3 of Figure 2;

Figure 4 is a sectional detail view taken on the line 4—4 of Figure 2;

Figure 5 is an elevational view of the throw-off device showing the enclosing cover in operative position; and Figure 6 is an end view taken on the line 6—6 of Figure 5.

Referring now more particularly to the illustrative embodiment comprised within the drawings, Figure 1 shows a construction comprising a guide channel 10 upon which are mounted tail-block 12, an intermediate slidable or oscillating block 14 and a fixed head or knock-off block 16.

The guide channel 10 includes a base flange 18 and opposed upstanding restraining side flanges 20, the inner face of the base flange being provided with a plurality of elongated guideways 22 (see Fig. 3). The tail-block 12 is rigidly bolted into the right-hand extremity of the guide channel 10, as viewed in Figures 1 and 2, by bolts 24 and centrally apertured to provide a bearing guideway for a connecting bar 26 which is connected to an extension of the rod line as will hereinafter more fully appear.

The shiftable or sliding block 14 is disposed within the channel for movement as a crosshead and attention is particularly directed to the fact that the lower portions of the block 14 are so configurated as to complementarily engage the inner surfaces of the guide channel 10, Fig. 3, including the elongated recesses 22, whereby the block may reciprocate freely and longitudinally of the channel. Such reciprocation is effected by means of driving or connecting rods 28 normally actuated from a source of power, as will hereinafter more fully appear. As shown in Figure 2, headed extremities 30 of the rods are received within tapered spaced recesses 32 in the reciprocating block 14 and preferably leaded or otherwise rigidly attached to the block for permanent driving connection. The head knock-off block 16 is constructed in general similarly with the slidable block 14 but is permanently bolted to the left hand extremity of the guide channel as at 34. Attention is directed to the fact that the fixed block 16 is provided with spaced bearing apertures to accommodate the parallel drive rods 28 operative to guide these rods through the fixed block. Attention is particularly directed to the fact that the block is recessed within the extremity of the channel, as shown in Figure 1 to promote rigidity of interconnection.

The driving rods 20 outwardly of the fixed block are received by a head clamp or yoke 34' which serves to connect them to a main driving portion of the surface rod line 36. It will be understood that the clamp includes opposed castings adapted to grip the respective rods and having fasteners 38 adapted to longitudinally interengage with the rods, the bars 28 being preferably headed over or upset for this purpose. It will be further understood from the foregoing that the rod 36 may extend to any suitable driving source, such for example as the pitman of an operating engine. It will be noted that a similar clamp rigidly connects the driven or connecting bar 26 to the rod line 40 from the pump jack. Accordingly, therefore, transmission of reciprocating energy to the connecting bar 26 results in actuation of the pump.

Transmission of energy in accordance with the foregoing objects is effected by configurating the connecting rod and the head and sliding blocks as more clearly shown in Figures 1-4. To this end, it will be noted that the connecting bar, which, in the present instance, comprises a hollow tube, is transversely slotted by spaced elongated recesses 42 disposed in axial alignment throughout its length and adapted to receive holding blocks or keys 44. As shown in detail in the figures, each of these keys comprises a flat rectangular or prismatic body 46 of sufficient length to extend through the slotted bar 26 and preferably therebeyond. The thickness of each pin or key 44 is such as to permit it to be accommodated readily within each slot. It is particularly important to note that the inner key has an axial dimension equal to substantially less than the axial dimension of each slot 42, this relatively restricted dimension depending upon the length of the slot as will hereinafter more fully appear. Each key is provided with an upwardly extending manually manipulatable finger portion 48 and therebelow has oppositely laterally extending pins or trunnions 50. It should be further noted that I have rounded the upper extremities of the body 46 of the pin to permit rotational tilting about the trunnions 50 when arranged in operative association with the device.

For selective reception of the holding keys or pins 44, each of the blocks 14 and 16 are axially longitudinally recessed as at 52. The recesses are open at the extremity in adjacency with the driving rod 36 but terminate short of the other axial extremity of each block in a vertical abutment wall 54. Laterally disposed on either side of the recesses 52 and on the upper face of each block extend rigid projecting abutments or lugs 56 recessed to provide complementary journals for the key trunnions or pivots 50. From the fact that the recesses are open in their upper side, it will be obvious that the complementary recesses permit selective removal and insertion of the keys in the operating position shown for example in Figures 1-4, while disposing the keys for arcuate movement therein. It should be further noted that each of the recesses is provided with a vertical abutment surface 58 adjacent the driving end of the device and a slightly inclined or diverging opposite face 60. Accordingly, manipulation of the keys 44 into operative position is facilitated without interfering with transmission of axial driving forces.

From the foregoing, it will be apparent that holding pins or keys 44 may be inserted selectively within either or both of the blocks 14 and 16 whereby the key will tend to drop rotationally into the first of the slots 42 coming into registration with the respective block. Under such conditions, it will be apparent that the key 44 will normally occupy the vertical positions shown in Figures 1 or 4 with its right hand margin in complementary abutting relationship with the vertical holding or abutting surface 54 of the respective block. In such a position, as shown in Figure 4, it will be evident that the hollow connecting bar 26 cannot be moved to the right relatively with respect to the block, the key extending through and engaging the bar completely across its transverse extent and transferring all holding forces directly against the vertical surface 54. In other words, it must be particularly noted that in the relative directions mentioned, the connecting bar 26 and block are rigidly locked together where the bar passes through its bearing aperture by forces resolved axially, thus eliminating all twisting stresses liable to induce undesired frictional forces.

Under conditions adapted to relatively shift the connecting bar 26 to the left as viewed in Figure 2, it will be seen that the key or pin 44 may be carried rotationally to the left as it is met by the right-hand-most extremity of the engaging slot 42 and carried into the relative angular position indicated by the dotted lines in Figure 2. Thus, the connecting bar 26 may advance relatively to the left as far as desired, or until the key follows rotationally into the next succeeding slot.

From the foregoing, it will be apparent that in operation the sliding block 14 is normally reciprocated throughout a fixed predetermined path by longitudinal movement of the driven surface rod line 36 and the driving bars 28. With a key 42 disposed operatively within the shiftable block as shown in Figures 2 and 4, the tension upon the hollow connecting bar 26 exerted by the rod line 40 holds the left-hand-most extremity of the cooperating slot 42 against the complementary surface of the key 44 and accordingly engages the connecting bar with block 48 for movement therewith. As a result, the surface rod line 40 of the associated pumping jack and pump are reciprocated to pump the well. Should it be necessary to shorten or hold the surface rod line to the left for reciprocation in a new relative position, a second key 44 may be operatively associated with the head block 16. Upon movement of the connecting bar 26 to the left as viewed in the figures, the second key or pin 44 falls into the last slot in the path of reciprocation and upon the return of the sliding block 14 holds the connecting bar from moving therewith. As a result, the first key 44 is permitted to shift arcuately out of its slot 42 and fall into some succeeding slot 42 for the purpose of again positively advancing the bar to the left upon the succeeding stroke. In this manner, the rod line may be advanced as far as desired and caused to operate in any final position determined by final removal of the second key 44. This feature is of particular advantage in repairing broken or worn surface rod lines. It will be furthermore understood that operation of the well may be determined at any time without release of the rod line by merely inserting the second key 44 in the head block and removing the key 44 from the sliding block. At such times, the sliding block will reciprocate axially of the quiescent connecting bar 26.

It is of course understood from the foregoing that the guide channel 10 is adapted to be mounted permanently on any suitable horizontal base, not shown, and may be bolted thereto through extensions of the fasteners 24 and 34. The present construction furthermore is adapted to enclosure by a protective housing 62, illustrated more in detail in Figures 5 and 6, comprising upstanding longitudinal side walls 64 and end walls 66. It will be noted that the end walls are slotted or recessed inwardly of their lower edge as at 68 to accommodate the connecting bars 26 and 28. The upper portion is enclosed by oppositely inclined walls 68 having a central aperture covered by a hinged closure or door 70. The door is provided with oppositely inclined sections 72 and 74 complementary to the inclined walls 68 and forming a substantial continuation thereof in closed position. The door is hinged to one longitudinal edge of the aperture as at 76 and the spaced inclined section 74 is provided with a handle 78 facilitating swinging to open position. About the entire peripheral margin of the aperture the inclined walls 68 are provided with an upstanding flange 80, and an interengaging downwardly projecting flange 82 formed about the margin of the swinging closure 70 embraces the upstanding flange and prevents entry of moisture. It will be understood from the foregoing that manipulation of the present throw-off device is facilitated by swinging the door to open position and retaining the door closed during normal operation.

The present invention provides a simplified throw-off device adjustable in perfect safety by the operator while the parts are in motion. It is furthermore apparent that the holding and driving stresses are at all times resolved along the central axis of the entire device and thus the longitudinal relatively moving parts, in shifting freely with respect to one another, do so without frictional binding stresses. The present invention, moreover, provides a construction which is structurally adequate and adapted to be designed to meet the demands of severe loads, particularly those imposed by the mass of the rod line in relatively deep wells. It is furthermore apparent that the present invention provides a channel adapted to permanently retain an adequate supply of lubricant at all times.

Obviously, the invention is not limited to the specific structural arrangement disclosed herein but is capable of other modifications and changes without departing from the spirit and scope of the present invention.

I claim:

1. A safety throw-off device of the class described, comprising a relatively shiftable member, a relatively fixed member, an elongated connecting element operatively associated with said members, means for operatively connecting said element to either of said members, said last named means comprising a recess extending transversely completely through said element and key means engageable with said members and adapted to extend completely through said recess, said key being pivotal upon said member about an axis extending transversely of the element to a position outwardly of the bar, said recess being sufficiently elongated to permit the key to swing out of said recess and about said axis.

2. A safety throw-off device for a well pumping construction, comprising a relatively shiftable block, means for guiding said shiftable block in a predetermined path, a connecting bar extending through said block, a plurality of axially disposed recesses extending completely transversely through said bar, a key means adapted to extend completely transversely through said recesses, and pivot means having its axis disposed transversely to said bar and said recess for removably mounting said key upon said block for arcuate movement into and out of said recess, said recess being sufficiently elongated to permit the key to swing out of said recess and about said axis.

3. A safety throw-off device for a well pumping unit, comprising a relatively shiftable driven block, a connecting bar adapted to be longitudinally shifted by said block, means for interengaging said block and bar comprising recesses disposed longitudinally of said bar and extending completely transversely through said bar, a key adapted to reside in said recesses and extend completely through the bar in a transverse direction, means on said block for pivotally receiving said key for arcuate movement in a plane longitudinally of the bar, said block having abutment means on the block adjacent both extremities of the recess for positively limiting the arcuate movement of said key at said transversely extending position in one axial direction, and said key being arcuately shiftable away from said abutment in the opposite axial direction, said key and slot means being relatively proportioned whereby said key is adapted to shift arcuately outwardly of said recess when the bar is moved relatively in said opposite axial direction.

4. A safety throw-off device for a well pumping unit, comprising a relatively shiftable driven member, a connecting bar adapted to be driven by said member and extending centrally through said member, said bar being provided with longitudinally spaced slots extending completely transversely therethrough, a driving key adapted to extend completely through said transverse slot, means for removably supporting said key upon said member for rotational movement in a plane extending longitudinally of the bar to a position extending completely transversely through said member, abutment means associated with said member positively limiting arcuate movement of said key in one longitudinal direction in said transversely extending position, said key being of relatively limited longitudinal extent with respect to the slot and adapted to swing arcuately out of said slot when the bar moves relatively away from said abutment.

5. A safety throw-off device for a well pumping unit comprising a fixed member and a relatively shiftable driven member, a connecting element adapted to be driven by said driven member and extending centrally through said members, said element being provided with longitudinally spaced slots extending completely transversely therethrough, a driving key adapted to extend completely through said transverse slots, means for removably supporting said key upon said members for rotational movement in a longitudinally extending plane to a position extending completely transversely through the member, abutment means associated with each member positively limiting arcuate movement of said key in one longitudinal direction in said transversely extending position, said key being of relatively limited longitudinal extent with respect to the slot and adapted to swing arcuately out of said slot when the element moves relatively away from said abutment.

6. In a safety throw-off device for a well pumping unit, a relatively shiftable driving block, an elongated connecting rod passing through said block, and means for operatively connecting said block and said rod including a slot extending transversely completely through the rod and a key adapted to extend completely through said slot, means removably pivotally supporting said key in said transversely extending position about an axis located at one side of the rod and extending transversely of the rod and the slot for arcuate movement away from said transverse position in a plane extending longitudinally of the bar, said block including abutment means positively limiting arcuate movement of the key in the opposite longitudinal direction, said key being of relatively limited longitudinal extent with respect to the longitudinal dimension of the slot and operative to swing outwardly of said slot when the bar moves relatively in said first named longitudinal direction.

7. In a safety throw-off device for a well pumping unit, a relatively shiftable actuating block movable in a predetermined path, an elongated connecting bar passing centrally through said block, means for driving said connecting bar from said shiftable block comprising a recess in said block having a transversely extending abutment surface at one longitudinal extremity and located on diametrically opposed sides of the bar, journal means on the block adapted to removably receive a key, and a key having pivot portions receivable within said journal, said bar having longitudinally disposed slots extending transversely completely through said bar, said journal means being operatively disposed with respect to said abutment to positively retain the key in transversely extending position with a portion extending completely through one of said slots and contacting said abutment surfaces on opposite sides of the bar when the bar is shifted axially toward said abutment, said key being freely arcuately shiftable on said pivot portions in the opposite longitudinal direction and said key being of relatively limited longitudinal extent with respect to the slot and operative to swing outwardly of said slot when the bar is shifted relatively in an opposite longitudinal direction.

8. In a safety throw-off device for a well pumping unit, a relatively shiftable block, an elongated connecting bar passing centrally through said block, elongated slots extending completely transversely through said bar and disposed longitudinally of said bar, a key adapted to extend through said slots, means on the block for removably pivotally supporting said key in a position extending completely transversely through said bar and about an axis extending transversely to said bar and said slots, abutment means on said block engageable with one laterally extending face of the key and adapted to limit the arcuate movement of said key in one longitudinal direction, said key being arcuately shiftable in an opposite longitudinal direction away from said abutment and said slots being relatively longitudinally elongated to permit the key to swing outwardly of said bar in said opposite longitudinal direction.

9. In a safety throw-off device for a well pumping unit, a relatively shiftable member having a passage for receiving a connecting element extending therethrough and means on said member for connection to said element comprising a recess disposed transversely on either side of the passage, journal means on the member for removably, rotatably supporting a key for arcuate movement within said recess, and abutment means associated with said recess extending transversely of said member and cooperatively disposed to limit arcuate movement of said key in a transversely extending position.

10. In a safety throw-off device for a well pumping unit, a relatively fixed member and a relatively shiftable member, each of said members having means for receiving a connecting element extending therethrough and means on each member for connection to said element comprising recess means projecting transversely in both directions beyond the operative position of said bar, journal means on each member for removably rotatably supporting a key for arcuate movement within said recess, and abutment means associated with said recess and extending transversely of each member and cooperatively disposed to limit arcuate movement of said key in a transversely extending position.

11. A safety throw-off device of the class described comprising a shiftable bar and a member adapted for selective attachment thereto, means for operatively connecting said bar to said member, said last named means comprising a recess extending transversely completely through said bar and key means journalled in said member and adapted to extend completely through said recess, said key being pivotal upon said member about an axis extending transversely through the bar to a position completely outwardly of the bar, said recess being of sufficient longitudinal extent to permit the key to swing freely out of said recess about said axis, said key having abutment surfaces adapted to positively engage the member when the parts are relatively urged in one rotational direction.

CARL D. WAGNER.